April 21, 1925.
J. BALZAK
1,534,099
ICE CREAM DISHER
Filed June 26, 1924
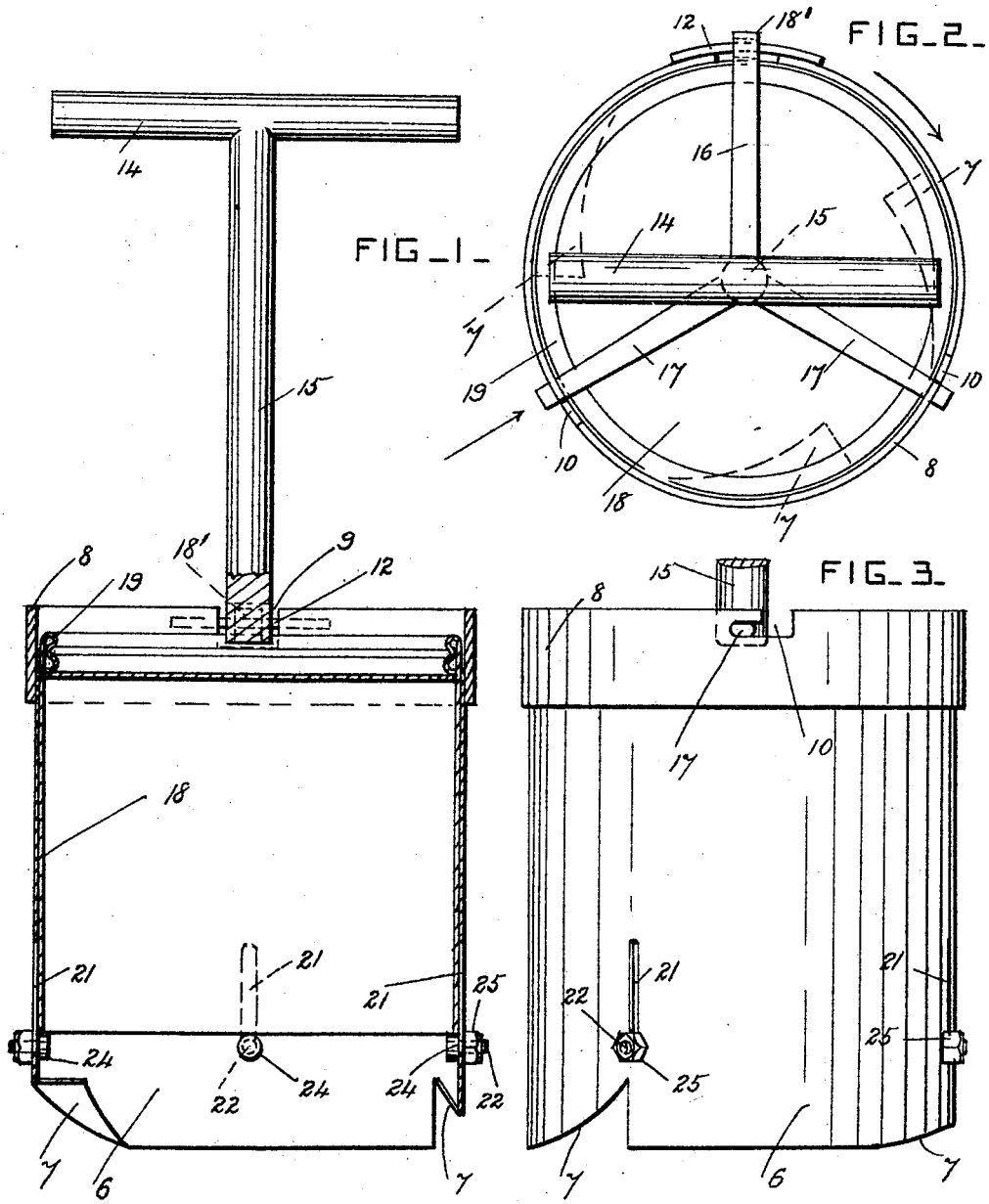
Inventor.
Julius Balzak
by Herbert W. Jenner
Attorney.

UNITED STATES PATENT OFFICE.

JULIUS BALZAK, OF CHICAGO, ILLINOIS.

ICE-CREAM DISHER.

Application filed June 26, 1924. Serial No. 722,483.

*To all whom it may concern:*

Be it known that I, JULIUS BALZAK, a citizen of the United States, residing at Chicago, in the county of Cook and State of Illinois, have invented certain new and useful Improvements in Ice-Cream Dishers, of which the following is a specification.

This invention relates to means for extracting soft material, such as ice cream, in predetermined amounts from receptacles containing the same in bulk; and it consists in the novel construction and combination of the parts hereinafter fully described and claimed.

In the drawings, Figure 1 is a vertical section through an ice cream disher constructed according to this invention. Fig. 2 is a plan view of the same. Fig. 3 is a side view of the cylinder, looking in the direction of the straight arrow in Fig. 2.

A cylinder 6 is provided, and has spiral teeth or blades 7 at its lower edge for cutting into the ice cream which is kept in bulk in any suitable receptacle. The cylinder 6 has a strengthening band 8 around its top edge, and this band has a slot 9 and two or more undercut slots 10 in its top edge. A pivot pin 12 is secured across the slot 9.

A handle 14 is provided at the top of a shank 15, and the shank 15 has at its lower end a radial arm 16, and two or more radial arms 17. The arm 16 has an eye 18' which is pivoted loosely on the pivot pin 12. The arms 17 engage with the undercut slots 10, and when the handle is turned in the direction of the curved arrow in Fig. 2, the arms are locked in the slots, and the cylinder can be screwed downwardly into the ice cream.

When the handle is moved a little in the reverse direction to the curved arrow, the arms 17 are unlocked from the undercut slots, and the handle and arms can be tilted over on the pivot pin so as to leave the upper end of the cylinder entirely open and unobstructed.

A container 18 for the ice cream is provided, and is preferably formed of paper material. This container is inverted and slid downwardly into the cylinder, as shown in Fig. 1, when the handle and arms are tilted out of the way. The handle and arms are then moved to the positions shown in Fig. 1, and the arms 17 are interlocked with the slots 10. The bead 19 on the bottom of the container bears against all three arms, and when the cylinder is forced down into the ice cream, the container is filled with the ice cream. The filled container is withdrawn from the ice cream by the handle, and the arms are then unlocked and are tilted over on the pivot pin so that the filled container 18 can be removed from the cylinder.

In order to assist in the removal of the container from the cylinder, vertical slots 21 are preferably formed in it. Bolts 22 are slidable in these slots, and have heads 24 inside the cylinder and nuts 25 outside it. These bolts form push pieces, and the heads 24 are arranged below the bottom edge of the container. As many slots and push pieces as desired can be furnished. When the nuts 25 are pushed upwardly, the container is raised in the cylinder so that it can be seized by hand and pulled out of the cylinder.

The ice cream is sold in the container, which is closed in any approved way, and which contains a predetermined amount of the ice cream. A new container is inserted in the cylinder each time the device is used, and the spiral blades which project inwardly at the bottom edge of the cylinder cause the free separation of the ice cream in the container from the ice cream below it when the container is full and the handle and cylinder are suitably manipulated. The use of this device enables the ice cream to be dispensed without exposing it freely to the dust and impurities in the atmosphere.

What I claim is:

1. A dispensing device, comprising a cylinder open at each end and having undercut slots in its upper end, and a handle pivoted to the upper end of the cylinder at one side thereof and provided with arms which engage with the undercut slots and form an abutment for a container which is slidable in the cylinder.

2. A dispensing device, comprising a cylinder open at each end and having a pivot pin and undercut slots at its upper end, and a handle provided with a shank having radial arms one of which is pivoted on the said pin and the others of which engage with the said slots, said arms being adapted to form an abutment for a container which is slidable in the cylinder.

3. A dispensing device as set forth in claim 1 and having also spiral blades at its lower end which project inwardly of the cylinder.

4. A dispensing device as set forth in claim 1 and having also slots in the lower end portion of its cylinder, and push pieces slidable in the said slots and affording a means for sliding the container upwardly in the cylinder.

In testimony whereof I have affixed my signature.

JULIUS BALZAK.